United States Patent

[11] 3,619,613

| [72] | Inventor | Henry R. Chope |
| | | Columbus, Ohio |
| [21] | Appl. No. | 883,247 |
| [22] | Filed | Dec. 8, 1969 |
| [45] | Patented | Nov. 9, 1971 |
| [73] | Assignee | Industrial Nucleonics Corporation |
| | | Continuation of application Ser. No. |
| | | 559,128, June 21, 1966, now abandoned. |

[54] DIGITAL MEASURING SYSTEM UTILIZED IN STANDARDIZING A NUCLEONIC MEASURING GAUGE
41 Claims, 2 Drawing Figs.

[52] U.S. Cl. ............................................. 250/83.3 D,
    250/83 C
[51] Int. Cl. ..................................................... G01n 23/16
[50] Field of Search .......................................... 250/83 C,
    83.3 D

[56] References Cited
UNITED STATES PATENTS

| 3,248,545 | 4/1966 | Hansen | 250/83.3 D |
| 3,348,046 | 10/1967 | Lloyd | 250/83.3 D |

*Primary Examiner*—Archie R. Borchelt
*Attorneys*—William T. Fryer, III, C. Henry Peterson, James J. O'Reilly and Cushman, Darby & Cushman ABSTRACT: A system for measuring the basis weight per unit area using a nucleonic gauge with a digital measuring circuit for counting detector output pulses to obtain a digital indication of the instant measurement. The pulse-counting circuit operates to take the difference between the detector output pulses during a counting period and the pulses from and operating point or reference pulse generator. To effect standardization, any decrease in the detector output pulse rate is measured while the material is out of the radiation path and the reference pulse rate is decreased accordingly or the counting periods are increased inversely of that decrease, or both.

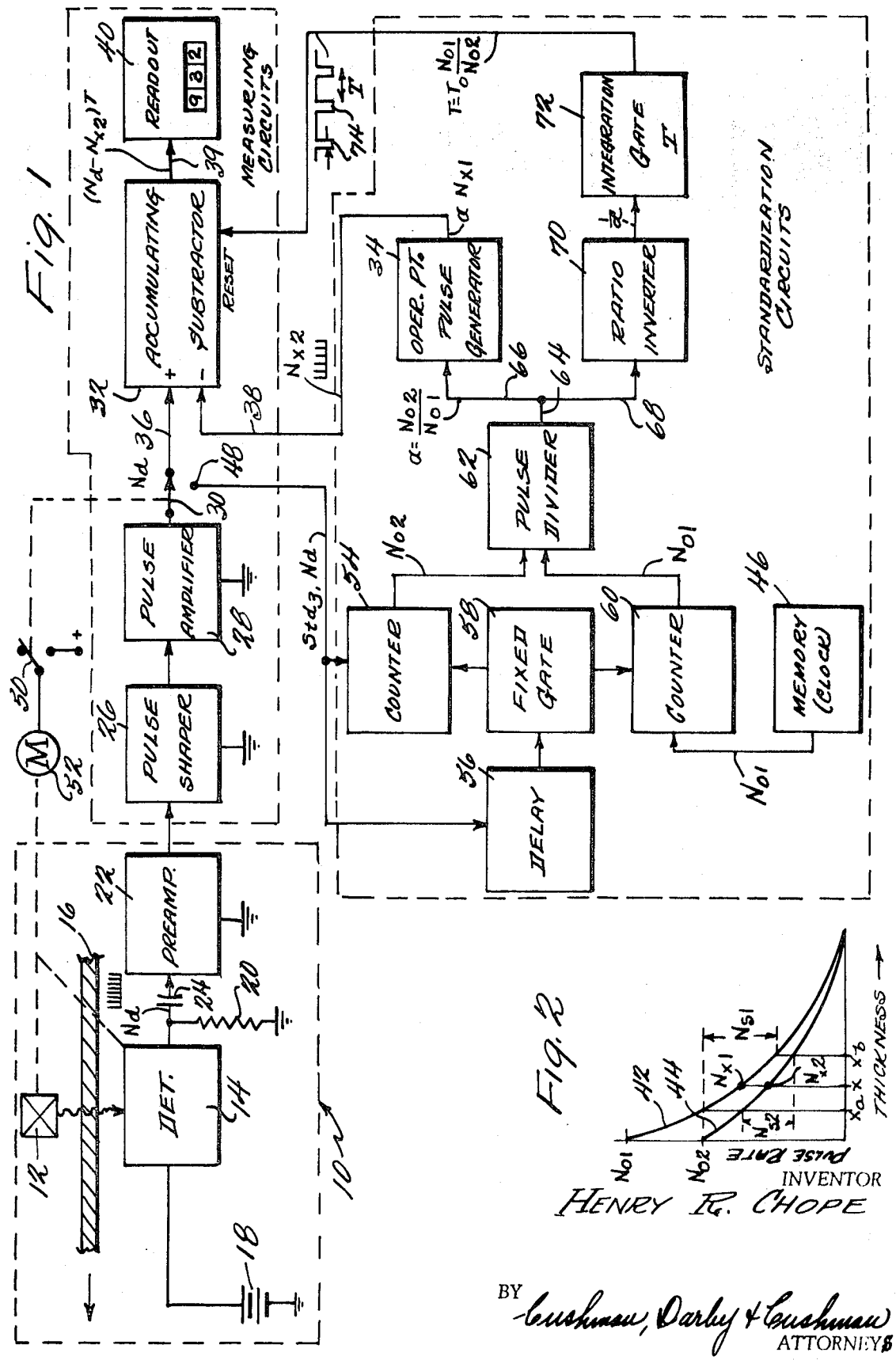

DIGITAL MEASURING SYSTEM UTILIZED IN STANDARDIZING A NUCLEONIC MEASURING GAUGE

This application is a continuation of Ser. No. 559,128, filed June 21, 1966, now abandoned.

This invention relates to a measuring system, and more particularly to a nucleonic gauge for determining the weight per unit area of material which normally is moving through the gauge.

As is well known, such gauges are used to measure not only weight per unit area, but thickness if the density of the material is constant, or density if the thickness of the material is constant. For convenience, the detailed description of this invention is in terms of measuring thickness of a sheet of material which passes through the gauge, but it is to be understood that no limitation is intended to measurement of thickness.

This invention concerns itself with a system which has the ability to measure and resolve individual pulses emanating from a radiation source. When a material passes between a nucleonic radiating source and a pulse detector in a transmission type of gauge, or in front of both the source and detector in a backscatter type of gauge, the average count rate of pulses from the detector is varied in accordance with the weight per unit area or area density of the absorbing material being measured.

Broadly speaking, an object of this invention is the provision of apparatus to standardize a nucleonic measuring gauge of the type that bases its measure on the count of radiation induced pulses from a nucleonic radiation detector. In general, the invention takes either or both of two forms. In one, the successive count periods are regulated in length to effect standardization. In the other, an operating point pulse generator is regulated in frequency to effect standardization. Either of the foregoing ways may be sufficiently accurate under certain measuring circumstances, while both together provide for very accurate measurements over a wider range of variations. When both forms of standardization are used in the present invention, or when just frequency regulation is used, the rate of pulses from the detector unit is compared during the time the material thickness is being measured, with pulses from a source of operating point pulses whose rate or frequency is determined during standardization times so as to compensate for all circuit changes and environmental factors including source decay and foreign matter on the detector or in the radiation column. In a specific embodiment disclosed, the comparison means is a pulse accumulating subtractor, which counts the difference. When both forms of standardization are employed, successive counting periods of time are compensated in length inversely as the rate of pulses which are compared with the detector output pulses. If the operating point generator is not used, then the subtractor part of the accumulator is not needed, and standardization is effected by lengthening the counting period to compensate for the aforesaid circuit changes and environmental factors.

It is therefore another object of this invention to provide in a nucleonic-measuring system of the type which produces pulses having a rate indicative of the measure of material being gauged, a standardizing arrangement which compensates for changes in the circuitry and environmental factors in the source-detector unit.

Another object of this invention, in conjunction with the preceding object, is the provision of an operating point pulse-generating means having a pulse rate determined and standardized by changes in the rate of the detector rate output pulses during successive standardizing periods when the material being measured is out of the source-detector radiation path, with the standardized pulse rate being effective during measuring times to allow for an accurately reproducible reading of weight per unit area or the like.

Still another object, in conjunction with the second preceding object, and with or without the last object, is the provision of pulse accumulation means having successive counting periods of length determined and standardized by changes in the rate of pulses from the detector unit during successive standardizing periods when the material being measured is out of the source detector radiation path.

Still other objects and advantages of this invention will become apparent to those of ordinary skill in the art upon reading the appended claims and the following detailed description of the invention, in conjunction with the drawings, wherein:

FIG. 1 is a block diagram of a total measuring system incorporating the present invention, and FIG. 2 is a graph showing absorption curves useful in explaining the invention.

In FIG. 1, the source-detector assembly 10 includes a source 12 of any desired type of nucleonic pulse radiation and a radiation detector 14 which has the ability to detect and resolve individual pulses issuing from source 12. A sheet of material 16, which normally passes through the gauge in a lengthwise direction by means not shown, changes the amount of radiation received by detector 14. In this manner the weight per unit area of the material may be continuously gauged while it is moving. The material may be of any type, including paper, plastic, rubber, or any other material which is produced in sheet form. As above-indicated, if the density of the material is constant, then the output of detector unit 14 is effectively indicative of the thickness of the material.

Detector 14 is operated by a battery 18, and produces its pulses across a high-megohm resistor 20. These pulses are of a random rate $N_d$, which is varied according to the instant thickness of material 16 as it passes through the radiation path. Within the source-detector assembly 10 is preferably a preamplifier 22, to which the developed pulses are coupled by condenser 24. The purpose of preamplifier 22 is mainly to match detector 14 to the electronics that follows the preamplifier. If desired, a pulse shaper 26 may be employed to cause the pulses from preamplifier 22 to be of uniform height and equal width. Pulse amplifier 28, therefore, delivers to switch 30 random output pulses of uniform height and equal width at the $N_d$ rate.

Provided in the pulse measuring circuit is a gated accumulating subtractor 32, which compares the pulse rate $N_3$ with pulse rate from operating point generator 34, in a subtractive form. That is, accumulating subtractor 32, which can actually be a pulse subtractor followed by a separate accumulator, counts the $N_d$ pulses on its forward counting input line 36 and subtracts the pulses on its reverse counting input line 38, in a given period of time, termed a counting period, to provide a signal, such as a count on register 40, indicating the difference in pulse rates. Generator 34 issues operating point or reference pulses having a count rate denoted $N_{r2}$. As will be more apparent later, this reference pulse-count rate causes zero suppression or a center scale operation in the readout. That is, when $N_d$ equals $N_{r2}$, the output on line 39 from the accumulating subtractor 32 is zero. This means that there is no count accumulated, and consequently the digital readout register 40 is zero (000) during such times. As will become more apparent below, a zero reading is obtained only if the thickness of material 16 remains constant at a desired thickness $x$ during the accumulation period T when accumulator 32 is allowed to count and subtract pulses. Normally, however, there is either a positive or negative pulse output on line 39 during each period T, so that register 40 shows more or less than (000).

As is well known, measuring equipment of the general type described above, needs standardizing periodically to compensate for changes in various factors which change the operation of the equipment. This includes not only changes in values of various elements such as resistors, condensers, amplifiers and the like, but mainly changes in the source-detector environment and source decay. That is, as the source decays or as extraneous material builds up on the detector or between the source and detector, the random pulse rate in $N_d$ for a given thickness of material decreases. This is illustrated in the graph of FIG. 2. Assuming the equipment to be initially operative on absorption curve 42, the count rate from the detector at a material thickness $x$ is $N_{x1}$. However, if the source decays or extraneous material builds up between the source and detector, the equipment operates on a lower absorption curve, such as curve 44. In this case, the new count rate from the detector for the desired thickness $x$ is $N_{x2}$, a value lower than the initial desired rate $N_{x1}$. To compensate for the difference between $N_{x1}$ and $N_{x2}$, use is made of the pulse rates $N_{o1}$ and $N_{o2}$ which occur at zero-thickness of material between the source and detector and which show on the graph in FIG. 2 at the points where absorption curve 42 and 44 intersect the ordinate.

The initial standardizing pulse rate $N_{o1}$ may be set up in a memory of any desired type such as a preset frequency clock 46. To obtain the new standardizing pulse rate $N_{o2}$, switch 30 is moved to its lower contact 48 in conjunction with the downward movement of motor switch 50, which energizes motor 52. This causes the source 12 and detector 14 to be moved as a unit sidewise relative to material 16, on a conventional carriage (not shown) to such a degree that they are "off-sheet," i.e., none of material 16 is any longer in the radiation path between the source and detector. Alternatively, the measured material can be removed and the source and detector can remain stationary. Therefore, detector 14 looks directly at source 12, except for any extraneous material that has built up between the source and detector, and for which compensation is desired, along with compensation for source decay, etc., as previously explained. Motor 52 is energized preferably periodically, for example every one-half hour, to withdraw the source and detector off-sheet, and to effect standardization.

When switch 30 is in its downward position, the pulse rate $N_d$ is then a standardizing pulse rate, and the pulses are delivered to counter 54 and also to a delay unit 56. Delay 56 prevents operation of gate 58 until such time as the source and detector are fully off sheet. Alternatively, gate 58 can be prevented from operating until a switch on the carriage is activated when the source and detector are off-sheet. Gate 58 may be, for example, an asymmetrical multivibrator which is triggered by a delayed pulse output from unit 56. At that time, gate 58 operates counters 54 and 60 for a predetermined length of time. A typical time might be in the 1 to 10 second range, though limitation thereto is not intended. The output from counter 54 is the new standardizing pulse rate $N_{o2}$ for a given period of time, while the output from counter 60 is the initial count rate $N_{o1}$ for that same length of time. These two groups of pulses are applied to a pulse divider 62, which in the instantly described embodiment produces on line 64 a signal level denoted $\alpha$ which is equal to the ratio $N_{o2}/N_{o1}$. This ratio is equal to the percentage decrease of the absorption curve at zero absorber, i.e., when material 16 is not in the radiation path, both at initial calibration and at each standardization period thereafter. It can be shown simply that if the value of the absorption curve at zero thickness decreases a given percentage, then each point along the curve likewise decreases by the same percentage.

Pulse generator 34 is initially set to provide an output pulse rate of $N_{x1}$, which is the operating point on the initial absorption curve 42 in FIG. 2. In order to change the operating point from curve 42 to curve 44, the output pulse rate of generator 34 is decreased by the ratio resulting from pulse divider 62, by applying that output via line 66 to generator 34. This effectively multiplies the rate $N_{x1}$ by $\alpha$, which is the new standardized rate $N_{x2}$ applied to subtractor 32.

From FIG. 2, it can be seen that when the absorption curve drops to a new value, the pulse span $N_{s1}$ is reduced to a new pulse span $N_{s2}$. Thus, for a thickness span ranging from $x_a$ to $x_b$, there is a lesser number of counts available at switch 30, and therefore on line 36, to activate the accumulator and its associated readout. To compensate for this, the counting period or integration time T, which typically may be in the 0.1–1.0 second ranges (no limitation intended,) is increased by the reciprocal of $\alpha$ i.e., by $1/\alpha$, which is the ratio $N_{o1}/N_{o2}$. This ratio is the inverse of the ratio employed to decrease the pulse rate from generator 34. To obtain this inverse ratio, the signal level on line 64 may be applied via line 68 to a ratio inverter 70, which may be an analog reciprocal divider for example. The resulting output of inverter 70 is applied to an integration gate 72 for increasing the normal counting period T by the ratio $N_{o1}/N_{o2}$. Gate 72 may be a free-running asymmetrical multivibrator, for example, which provides a pulse 74 between the variable length counting periods T, to reset accumulator 32 and readout 40 to zero.

From the foregoing, it is apparent that accumulator 32 counts the difference in the number of pulses on lines 36 and 38 during each counting period T and readout 40 registers these pulses during that time to give a very accurate indication of the instant thickness of the material being measured. With the operating point pulse rate being decreased by the ratio $\alpha$ and the counting periods increased by the inverse of that ratio, it is apparent that a highly reliable system is effected so that reproducibility of the same count in readout register 40 can be obtained for the same thickness of material passing between the source and detector, notwithstanding source decay or other environmental conditions such as extraneous material buildup between the source and detector.

Pulse divider 62 may be of any desired type, for example any of the ratio computing circuits described and explained in the copending Clerc application, Ser. No. 383,307, filed July 17, 1964. Instead of using a ratio inverter 70 between pulse divider 62 and gate 72, a second pulse divider may be connected to the outputs of counters 54 and 60 to provide the desired inverse ratio $N_{o1}/N_{o2}$.

Still other changes may be made in the standardization circuitry without departing from the scope of this invention, for example analog equipment may be employed instead of digital equipment. For example, instead of the frequency clock 46, a fixed potential, which is correlated to the desired $N_{o1}$ rate, may be used in conjunction with another potential which changes amplitude based upon the standardizing pulse rate received from switch terminal 48 during a standardizing period. These two potentials could be compared in an analog-dividing arrangement to provide the ratio $\alpha$ and its reciprocal.

Still further, the whole digital arrangement could take the form of a digital computer with a master clock. Such a computer would calculate the percentage decrease of the absorption curve at zero absorber and compensate the operating point and integration times accordingly, so as to provide highly accurate readout.

While the foregoing description concerning FIG. 1 indicates that accumulator 32 is of the subtracting-type so that it totals the difference between the detector output pulse of line 36 and the operating point pulse on line 38, the accumulator may be of the additive-type instead. That is, it may add the pulses on lines 36 and 38, in which case the sum thereof may be compared with a predetermined number in the accumulator 32 or readout 40. For example, readout 40 could be such as to read 000 when the sum is twice the number of operating pulses on line 38 during a given counting period, so that the numerical indication from readout 40 would again indicate the relative amount that the thickness of material 16 has deviated above or below the amount corresponding to the operating point pulse rate as then standardized. In like manner, the accumulating subtractor 32 and readout 40 may be designed in any other desired manner to count pulses and indicate changes in the material thickness.

FIGS. 1 and 2 and the foregoing description thereof have detailed a specific form of this invention as it includes two different types of standardization means for compensating for source decay, accumulation of dirt or the like on the source, and other source-detector environmental changes, along with changes in circuit components and values. In certain circumstances, such as when the range or thickness variations to be measured is normally smaller than presumed above, span standardization may not be necessary. That is, if desired, the equipment in FIG. 1 which varies the length of the counting periods T, could be eliminated, so that all counting periods are of equal length. In particular, the connection from pulse divider 62 to integration gate 72 may be removed under those circumstances, while gate 72 is simplified because it no longer needs to be variable or adjustable. Otherwise, the circuitry may remain the same, with all of the required standardization being effected by varying the frequency or rate of the operating point pulses in the manner previously described.

Alternatively, the invention includes standardization by only regulating the length of the counting periods in accordance with the variations in the standardizing pulse rate. That is, in this form of the invention, the operating point pulse generator 34 and connections from divider 62 to accumulator 32, may be eliminated, while span standardization is retained so that the length of the counting periods continues to be regulated as previously described. In this embodiment, the accumulating subtractor 32 may be simplified to a gated or resettable counter with just totals the detector output pulses on line 36 during each of its successive counting periods. This form of the invention will still compensate for source decay and build up of foreign matter on the source, as well as other variables in the measuring circuit. In this case, a certain thickness of material 16 is represented by a particular pulse count. When the source decays or accumulates foreign matter, the pulse count is reduced and the gauge calibration is off, indicating a smaller thickness of material than actually present. Accordingly, this form of the invention compensates the thickness gauge for such variables by changing the count time so that the same number of pulses per unit of time can be counted. In other words, the length of the counting periods after successive standardizing times, is increased, if and as the source decays and/or has foreign material accumulated on it. All that is needed is to maintain this relationship, and the gauge will continuously readout the proper thickness.

In a broader sense, the present invention stores a signal ($N_{o1}$) in memory 46 that is proportional to the initial standardization pulse rate. The stored signal ($N_{o1}$) is compared with the subsequent standardizing pulse rate (stdg. $N_d$) at regular intervals. After each comparison a signal that is proportional to the difference in pulse rates is used to adjust the nucleonic system, to restore the readout signal to the calibrated value for a given value of the measured variable. In other words, the nucleonic systems reads out the same thickness value for a material thickness measured at calibration and subsequent thereto, even though the nucleonic system has changed in some way, such as through source decay. The adjustment may be accomplished by changing the operating point pulse rate $N_{x2}$ or the counting period, depending on which system is used. Alternatively, the initial standardizing pulse rate may be stored as an analog signal and compared with a subsequent standardizing analog signal derived from an integrating or averaging circuit receiving the detector pulses. The difference in the initial and subsequent standardizing pulse rates can be used to control the integrating or averaging time constant, such as by adjustment of the capacitance and/or resistance in a parallel resistor-capacitor integrator or averager. Other forms of adjustment can be used, and the method can be performed by automatic, or hand adjustment of the operating point-generator pulse rate, counting period, or integrating or averaging circuit time constant.

From the foregoing, it is apparent that this invention preserves the digital character or pulse nature of individual radiation "events" or "pulses" such as may be provided by beta or gamma radiation sources. Because of the digital nature of the system, the radiation detector and electronic circuits handling the pulses, must have high resolution and wide bandwidth.

Thus, it is apparent that this invention has provided for all of the objects and advantages stated above. Still further objects and advantages and even further modifications of the invention, will become apparent to those of ordinary skill in the art upon reading this disclosure. It is emphasized, however, that this disclosure is not intended to be limitative but exemplary, the scope of the invention being defined by the appended claims.

What is claimed is:

1. In a nucleonic material-measuring system of the type that has means including a nucleonic source and detector unit for establishing a nucleonic radiation path from said source to said detector, wherein the material moves through said path to be measured and then causes an output from the detector of pulses having rates of recurrence indicating weight per unit area of the moving material and wherein said material and source-detector unit are relatively movable away from each other so that none of said material is in said radiation path and said detector then provides an output of pulses having a standardizing pulse rate dependent on various factors including the amount of source decay and foreign matter between the source and detector, the improvement comprising:

means for supplying reference pulses at a rate effectively determined by the said standardizing pulse recurrence rate, and means operative during successive periods of time determined in length by the said standardizing pulse rate, for combining with said reference pulses the said output pulses that are issued from the detector while the system is measuring said material to provide a standardized indication of the measure of said material during each such period.

2. Apparatus as in claim 1 wherein said combining means includes a pulse-accumulating subtractor for providing a signal indicating the difference in rate between said output and reference pulses.

3. Apparatus as in claim 1 wherein the reference pulse supplying means includes a pulse generator and means for changing the pulse rate of said generator to compensate for changes in said standardizing pulse rate, and wherein said combining means includes a gated pulse accumulator for counting the difference between the detector output pulses and reference pulses, gating means for resetting the count in said accumulator to zero periodically, and means for changing the length of the counting periods for said accumulator to compensate for changes in said standardizing pulse rate.

4. Apparatus as in claim 3 wherein said pulse rate and counting period compensating means includes means for providing pulses at a rate indicating an initial standardizing rate which is correlated to the actual initial standardizing recurrence rate aforesaid, means for counting said initial standardizing rate pulses for a predetermined time while said material and source-detector unit are relatively moved away from each other, means for counting said detector output pulses for said predetermined time while said material and source-detector unit are relatively moved away from each other, means for decreasing the rate of pulses from said generator by the ratio of the counted detector pulses to the counted initial standardized pulses and for increasing the period of said gating means by the inverse of that ratio.

5. A nucleonic, material thickness, measuring gauge comprising:

a nucleonic source and detector unit positionable adjacent a sheet of material to be gauged in thickness while the sheet is moving lengthwise, means for providing for a recurrent standardizing period including means for moving said source-detector unit off sheet so that said sheet is out of the source-detector radiation path, means connected to said detector for deriving pulses having a standardizing rate when said source-detector unit is moved off sheet and a measuring rate of recurrence when said unit is adjacent said sheet as aforesaid and operating to effect measurement of the material, a pulse generator having an initial pulse production rate correlated to a desired thickness for said material, means for subtracting, and accumulating the difference of, during successive periods of time, the detector derived pulses when produced at the said measuring rate from the pulses from said pulse-generating means, means for effectively comparing the instant standardizing pulse rate, while said source-detector unit is moved off sheet, with a pulse rate representing a previous standardizing rate, and means for decreasing the rate of pulses from said pulse generating means by the ratio of the instant standardizing pulse rate to the previous standardizing pulse rate and for lengthening said accumulator periods of time by the inverse of that ratio.

6. Apparatus as in claim 5 wherein said means for comparing said instant and previous standardizing pulse rates include a second pulse generator for producing pulses at a predetermined rate which is said previous standardizing rate, means for counting the pulses from said second generator and those from said detector while said source-detector unit is off sheet, and means for effectively dividing the resulting counts to effect a ratio therebetween.

7. In a nucleonic material-measuring system of the type that has means including a nucleonic source and detector unit for establishing a nucleonic radiation path from said source to said detector, wherein the material moves through said path to be measured and then causes an output from the detector having pulse rates indicating weight per unit area of the moving material and wherein said material and source-detector unit are relatively movable away from each other so that none of said material is in said radiation path and said detector then provides a pulse output of standardizing pulse rate dependent on various factors including the amount of source decay and foreign matter between the source and detector, the improvement comprising:

means for supplying reference pulses at a rate effectively determined by the said standardizing pulse recurrence rate, and means for combining with said reference pulses the said output pulses that are issued from the detector while the system is measuring said material to provide a standardized indication of the measure of said material.

8. Apparatus as in claim 7 wherein the reference-pulse-supplying means includes an operating point pulse generator and means for changing the pulse rate of said generator to compensate for changes in said standardizing pulse rate.

9. In a nucleonic material-measuring system of the type that has means including a nucleonic source and detector unit for establishing a nucleonic radiation path from said source to said detector, wherein the material moves through said path to be measured and then causes an output from the detector of pulses having rates of recurrence indicating weight per unit area of the moving material and wherein said material and source-detector unit are relatively movable away from each other so that none of said material is in said radiation path and said detector then provides an output of pulses having a standardizing recurrence rate dependent on various factors including the amount of source decay and foreign matter between the source and detector, the improvement comprising:

means operative during successive periods of time for counting the said output pulses that are issued from the detector while the system is measuring said material, and means for determining the length of said time periods in accordance with the said standardizing pulse recurrence rate to provide a standardized indication of the measure of said material during each such period.

10. Apparatus as in claim 9 wherein said counting means includes a gated pulse accumulator and said determining means includes gating means for resetting the count in said accumulator to zero periodically, and means for increasing the length of the accumulator counting periods as the said standardizing pulse rate decreases.

11. A nucleonics radiation gauge comprising a source and radiation pulse detector whose measurement of a single physical variable depends upon the average count rate of radiation pulses measured at said detector, said nucleonics radiation gauge further comprising:

means for counting output pulses from the radiation detector for a predetermined counting period, and means for modifying the counting period in accordance with changes in the radiation pulse rate caused by extraneous changes in variables other than the measured variable, said change in counting period being of such value that the totalized count of pulses for each counting period will be equal to the total pulses determined for a given value of the measured variable at the time of original radiation gauge calibration.

12. In a nucleonics-measuring system in which a property such as thickness or density of a material is measured by subjecting the measured material to radiation from a nucleonic radiation source and by detecting the resulting radiation received at a radiation pulse detector after said radiation has interacted with the said measured material, means for supporting said nucleonic source and pulse detector with respect to the measured material and for removing said source and detector at predetermined times in order to determine the radiation received at said detector for the condition in which the measured material no longer interacts with the radiation and in which the detected radiation pulse rate depends only on nonmaterial factors such as foreign material between the source and detector and the source strength existing at a given time, means operative during successive counting periods to count and totalize pulses issuing from the radiation pulse detector so as to provide an output reading of the measured characteristic in terms of the number of pulses received by the detector during each counting period, and means for determining the required length of said counting periods and for changing the said length of these counting periods in such a manner that the totalized number of counts received during each counting period will remain equal to the number of totalized counts for each value of measured characteristic determined during the original calibration of the measuring system.

13. Apparatus as in claim 12 wherein means operative during successive counting periods include a gated pulse accumulator and said means for determining the necessary length of said counting periods include time gating means for periodically resetting the count in each accumulator to zero and means for increasing the length of the accumulator counting periods as the detected radiation pulse rate changes due to nonmaterial characteristics such as foreign material between the source and detector, changes in source strength, and changes in efficiency of the radiation pulse detector.

14. A method of standardizing a nucleonic system measuring a variable wherein a source of nuclear radiation is cooperatively arranged with a radiation pulse detector and a means for counting the pulses from said detector in a given counting period, said nucleonic system being subject to variations in the total pulse count for a given variable value due to changes in the nucleonic system not attributable to a change in said variable, comprising the steps of:

comparing the total pulse count for a given value of said variable obtained at the time of calibration of said nucleonic system with the total pulse count after calibration, and adjusting said counting time period to restore said total pulse count to said pulse count at the time of calibration for said given value of said variable.

15. The method, as described in claim 14, wherein said steps comprise:

arranging said nucleonics system with said given value of said variable being measured, counting the pulses in said counting period to obtain the standardizing pulse count, counting pulses after calibration for said given value of said variable, and adjusting said counting period to maintain the standardizing pulse count for said given value of said variable.

16. A method for standardizing a nucleonic system for measuring a variable, said system comprising a source, radiation pulse detector, and readout means producing a signal indicating the measured variable, comprising the steps of:

measuring the initial standardizing pulse rate, measuring a subsequent standardizing pulse rate, and adjusting said nucleonic system in proportion to the difference between said measured pulse rates to restore the readout signal to the calibrated value for a given value of said variable.

17. A nucleonic device for measuring material, comprising means for providing a nucleonic radiation path including a radiation source and a radiation detector, means for causing said material to be in said path during measurement thereof and out of said path at other times, means for accumulating a total of pulses related to the radiation reaching the detector from the material during each predetermined measuring period, and means for modifying the total of pulses accumulated in accordance with the detected radiation when the material is out of the path to cause the accumulated total of pulses to be substantially the same each measuring period for a given measurement of said material regardless of the amount of radiation then detected, the detected radiation being dependent on various factors including the amount of source decay and the amount of foreign matter between the source and the detector.

18. A device according to claim 17 including a pulse generator for providing pulses at a rate representative of the detected radiation at a time when the material is out of said path before as said measuring period and in which the accumulated total comprises the difference between the number of pulses corresponding to radiation received by the detector during a said predetermined measuring period and the number of pulses received from said pulse generator during the same period, said modifying means being effective to modify said accumulated total by modifying the said pulse generator rate in accordance with changes in the radiation detected at a later time while the material is out of the path.

19. A device according to claim 18 in which the time of said predetermined period is also varied by said modifying means to modify the said total of pulses accumulated.

20. A device according to claim 18 and in which said means for accumulating a total of pulses comprises means operative during successive measuring periods determined in length by the radiation detected while the material is out of said path, for combining with said generator pulses the output pulses that are issued from the detector while the system is measuring said material to provide a standardized indication of the measure of said material during each such period.

21. A device according to claim 17 in which the accumulated total includes the number of pulses received from the detector in said predetermined time period and said means for modifying the accumulated total of pulses includes means for modifying said period to compensate for changes in the detected radiation of the device.

22. A device according to claim 21 and in which said means for accumulating a total of pulses consists of a gated or resettable counter the gating or resetting of which is controlled in accordance with said predetermined period of time.

23. A device according to claim 22 and in which said predetermined time period is modified by multiplying the initial period by a factor $N_{o1}/N_{o2}$ where $N_{o1}$ is an initial detected radiation pulse rate while the material is out of said path and $N_{o2}$ is a subsequent detected radiation pulse rate while the material is out of said path.

24. In a nucleonic measuring system in which a property of a material is measured by subjecting the measured material to radiation from a nucleonic radiation source and by detecting the resulting radiation received at a radiation pulse detector after said radiation has interacted with the said measured material, said material being removable from said source and detector at predetermined times in order to determine the radiation received at said detector for the condition in which the measured material no longer interacts with the radiation and in which the detected radiation pulse rate depends only on nonmaterial factors such as foreign material between the source and detector and the source strength existing at a given time, means operative during successive counting periods to count and totalize pulses issuing from the radiation pulse detector so as to provide an output reading of the measured characteristic in terms of the number of pulses received by the detector during each counting period, and means for determining the required length of said counting periods and for changing the said length of these counting period in such a manner that the totalized number of counts received during each counting period will remain equal to the number of totalized counts for each value of measured characteristic determined during the original calibration of the measuring system.

25. Apparatus as in claim 24 wherein the means operative during successive counting periods include a gated pulse accumulator and said means for determining the necessary length of said counting periods include time-gating means for periodically resetting the accumulated count to zero and means for increasing the length of the accumulator counting periods as the detected radiation pulse rate changes due to nonmaterial characteristics such as foreign material between the source and detector, changes in source strength, and changes in efficiency of the radiation pulse detector.

26. In a nucleonic material-measuring system of the type that has means for establishing a nucleonic radiation path including a nucleonic source and detector unit, wherein the material moves through said path during a measuring time and then causes an output from the detector of pulses having rates of recurrence indicating weight per unit area of the moving material and wherein said material and source detector unit are relatively movable away from each other during a standardizing time so that none of said material is in said radiation path and said detector then provides an output of pulses having a standardizing pulse rate dependent on various factors including the amount of source decay and foreign matter between the source and detector, the improvement comprising:

means for counting said detector output pulses for a predetermined interval during a standardizing time to provide a standardized count, and means operative during a said measuring time for counting said detector output pulses in relation to said standardized count.

27. In a nucleonic material-measuring system of the type that has means for establishing a nucleonic radiation path including a nucleonic source and detector unit, wherein the material moves through said path during a measuring time and then causes an output from the detector of pulses having rates of recurrence indicating weight per unit area of the moving material and wherein said material and source detector unit are relatively movable away from each other during a standardizing time so that none of said material is in said radiation path and said detector then provides an output of pulses having a standardizing pulse rate dependent on various factors including the amount of source decay and foreign matter between the source and detector, the improvement comprising:

means for recounting said detector output pulses for the same predetermined interval during successive standardizing times to provide respective standardized counts, second means for counting said detector output pulses during successive measuring times, and means for operating said second counting means during each of the said measuring times in accordance with the said standardized count provided from the immediately preceding standardizing time.

28. A nucleonic-measuring system as in claim 27 wherein said second counting means counts said detector output pulses for predetermined counting periods during each of said successive measuring times and wherein said operating means regulates the length of said counting periods in inverse accordance with said standardized counts.

29. A nucleonic-measuring system as in claim 27 wherein said second counting means counts said detector output pulses during successive counting periods within each of said successive measuring times and wherein said operating means causes said second counting means to take the difference between the number of detector output pulses each counting period and a count effected by said immediately preceding standardized count.

30. A nucleonic-measuring system as in claim 29 wherein said operating means regulates the length of said counting periods in inverse accordance with the immediately preceding standardized count.

31. A nucleonic device for measuring material on the basis of weight per unit area comprising:
  means for providing a nucleonic radiation path, including a radiation source and a radiation detector,
  said material being in said path during measurement thereof and out of said path at other times,
  means for counting pulses related to the radiation reaching the detector from the material during each predetermined measuring period, and
  means for modifying the pulse count each period in accordance with the detected radiation when the material is out of the path to cause the pulse count to be substantially the same each measuring period for a given measurement of said material regardless of the amount of radiation then detected,
  the detected radiation being dependent on various factors including the amount of source decay and the amount of foreign matter between the source and the detector.

32. A device as in claim 31 in which the time of said predetermined measuring periods is varied by said modifying means to modify the pulse count for each such period.

33. A device as in claim 31 wherein said modifying means causes the counting means to count pulses in a subtractive manner in relation to the number of pulses corresponding to the radiation reaching the detector for a given interval while the material is out of the said path.

34. A device as in claim 33 in which the time of said predetermined measuring periods is also varied by said modifying means to modify the said pulse count during each said period.

35. In a nucleonic material-measuring system of the type that has means for establishing a nucleonic radiation path including a nucleonic source and detector unit, wherein the material moves through said path during a measuring time and then causes an output from the detector of pulses having rates of recurrence indicating weight per unit area of the moving material and wherein said material and source detector unit are relatively movable away from each other during a standardizing time so that none of said material is in said radiation path and said detector then provides an output of pulses having a standardizing pulse rate dependent on various factors including the amount of source decay and foreign matter between the source and detector, the improvement comprising:
  means for recounting said detector output pulses for the same predetermined interval during each of a series of standardizing times to provide respective standardized counts,
  means for counting said detector output pulses for counting periods occurring during a series of measuring times, and
  means responsive to said standardized counts for controlling the length of each of the said counting periods in accordance with the said standardized count provided from the immediately preceding standardizing time so that the count of detector output pulses obtained during each of said measuring periods provides a standardized representation of the measure of said material during each such period.

36. A nucleonic-measuring system as in claim 35 comprising second counting means for counting said detector output pulses during said successive measuring times and wherein said controlling means comprises means for regulating the length of said counting periods in inverse accordance with said standardized counts.

37. A nucleonic system as in claim 35 including means for decreasing the count of pulses obtained during said measuring periods by a number of pulses representative of a desired operating point value for said measure of said material, whereby said standardized indication is obtained with respect to said operating point value.

38. In a nucleonic material-measuring system of the type that has means including a nucleonic source and detector unit for establishing a nucleonic radiation path from said source to said detector, wherein the material moves through said path to be measured and then causes an output from the detector of pulses having rates of recurrence indicating weight per unit area of the moving material and wherein said material and source-detector unit are relatively movable away from each other so that none of said material is in said radiation path and said detector then provides an output of pulses having a standardizing pulse rate dependent on various factors including the amount of source decay and foreign matter between the source and detector, the improvement comprising:
  means operative during a series of time periods for producing an accumulation of said output pulses that are issued from the detector while the system is measuring said material,
  means for determining the length of said time periods in accordance with the said standardizing pulse recurrence rate, and
  means for decreasing said accumulation by a number of pulses correlated with the length of said time periods and said standardizing pulse rate so as to be representative of a desired operating point value for said material weight per unit area whereby said decreased accumulation of pulses provides a standardized representation of the measure of said material with respect to said operating point value during each such period.

39. A device suitable for measuring a property, such as weight per unit area, of a material, the device comprising
  a nucleonic radiation source and a radiation detector arranged to permit material to be disposed in a radiation path therebetween, so that said property affects the radiation received by the detector, the detector being adapted to produce pulses the mean pulses recurrence rate of which is a function of the radiation received by the detector,
  first counting means for counting said pulses during successive measuring periods in which material is disposed in said radiation path,
  further counting means for counting said pulses during successive standardizing periods in which no material is disposed in said radiation path,
  the measuring and standardizing pulse counts being dependent on at least one error-producing factor, and
  control means for controlling the operation of the first counting means during said measuring periods according to the standardizing pulse counts produced in the last preceding standardizing period and in a previous standardizing period, whereby to compensate for said at least one error-producing factor.

40. A device as claimed in claim 39 comprising
  a memory device, and
  wherein the control means comprises a control comparator which receives from said memory a quantity related to a pulse count produced during the said previous standardizing period and compares with said quantity the pulse count produced during said last preceding standardizing period so as to control the operation of the first counting means according to said comparison.

41. In a nucleonic material-measuring system of the type that has means including a nucleonic source and detector unit for establishing a nucleonic radiation path from said source to said detector, wherein the material moves through said path to be measured and then causes an output from the detector of pulses having rates of recurrence indicating weight per unit area of the moving material and wherein said material and source-detector unit are relatively movable away from each other so that none of said material is in said radiation path and said detector then provides an output of pulses having a standardizing pulse rate dependent on various factors including the amount of source decay and foreign matter between the source and detector, the improvement comprising means operative during a series of time periods for producing an accumulation of said output pulses that are issued from the detector while the system is measuring said material, means for determining the length of said time periods in accordance with the said standardizing pulse recurrence rate, and means for decreasing said accumulation by a number of pulses which is directly proportional to the product of the length of said time periods and said standardizing pulse recurrence rate to provide a standardized indication of the measure of said material during each such period.

* * * * *